United States Patent
Graglia et al.

(10) Patent No.: US 11,772,584 B2
(45) Date of Patent: Oct. 3, 2023

(54) MOTOR VEHICLE IGNITION SWITCH AND IGNITION DEVICE PROVIDED WITH THIS IGNITION SWITCH

(71) Applicants: BCS AUTOMOTIVE INTERFACE SOLUTIONS ITALY S.R.L., Nichelino (IT); FCA ITALY S.p.A., Turin (IT)

(72) Inventors: Daniele Graglia, Nichelino (IT); Alessandro Parusso, Turin (IT); Ivan D'Errico, Turin (IT)

(73) Assignees: BCS AUTOMOTIVE INTERFACE SOLUTIONS ITALY S.R.L., Nichelino (IT); FCA ITALY S.p.A., Turin (IT)

( * ) Notice: Subject to any disclaimer, the term of this patent is extended or adjusted under 35 U.S.C. 154(b) by 754 days.

(21) Appl. No.: 16/926,083

(22) Filed: Jul. 10, 2020

(65) Prior Publication Data
US 2021/0009056 A1 Jan. 14, 2021

(30) Foreign Application Priority Data
Jul. 12, 2019 (EP) .................................... 19425050

(51) Int. Cl.
*B60R 16/03* (2006.01)
*H01H 27/08* (2006.01)

(52) U.S. Cl.
CPC ............. *B60R 16/03* (2013.01); *H01H 27/08* (2013.01)

(58) Field of Classification Search
CPC .............. B60R 16/03; B60R 25/2063; B60R 25/02144; B60R 16/02; B60R 16/005; B60R 25/04; B60K 28/10; H01H 27/08; H01H 27/06
See application file for complete search history.

(56) References Cited

U.S. PATENT DOCUMENTS

| | | | |
|---|---|---|---|
| 3,590,612 A | 7/1971 | Henning | |
| 3,651,288 A * | 3/1972 | Cryer | H01H 27/06 200/43.07 |
| 4,965,460 A * | 10/1990 | Tanaka | G07C 9/00182 307/10.3 |
| 2006/0206249 A1 * | 9/2006 | Fujioka | B60R 25/066 701/1 |

FOREIGN PATENT DOCUMENTS

| | | |
|---|---|---|
| DE | 10056249 A1 | 5/2002 |
| FR | 2775643 A1 | 9/1999 |
| JP | H07245040 A | 9/1995 |

OTHER PUBLICATIONS

European Search Report issued in European Patent Application No. 19425050.2 dated Feb. 13, 2020.

* cited by examiner

*Primary Examiner* — Ojiako K Nwugo (57) ABSTRACT

A motor vehicle ignition switch has a first and a second electrical circuit for detecting the angular position of a key in an ignition lock, with a rotor that is rotatable about a rotation axis so as to be able to selectively take an off position, a starting position, a running position, an on position and an intermediate position, distinct from each other; the second circuit is independent of the first circuit and defines a resistive divider; the first circuit has a first, a second and a third conductive laminas, electrically isolated from each other; the first circuit has two contacts, one of which is arranged on the third lamina in the running position and in the starting position and on the first lamina in the intermediate position.

11 Claims, 7 Drawing Sheets

MOTOR VEHICLE IGNITION SWITCH AND IGNITION DEVICE PROVIDED WITH THIS IGNITION SWITCH

CROSS-REFERENCE TO RELATED APPLICATION

This patent application claims priority from European patent application no. 19425050.2 filed on Jul. 12, 2019, the entire disclosure of which is incorporated herein by reference.

TECHNICAL FIELD

The present invention relates to a motor vehicle ignition switch.

PRIOR ART

Vehicles with automatic gears typically have ignition devices that have an ignition lock activated by a key and, for safety reasons, provide a key retention function inside this lock. This function prevents the driver from extracting the key from the lock if the automatic gear selector is not in a parking position.

Generally, the rotation of the key inside the ignition lock causes, through a transmission, the rotation of a rotor in an ignition switch. As already known, the key can take different positions, including a running position and a vehicle off position, and only in the off position it can be removed from the ignition lock.

Normally, the aforementioned retention function is performed by a locking pin, which is movable between a retracted configuration and an advanced configuration, in which it stops the rotation of the key in an intermediate angular position between the running position and the off position. When the automatic gear selector is in the parking position, the locking pin moves into the retracted configuration and leaves the key free to rotate into the off position. The translation of the locking pin is generally obtained by means of an electromagnet according to two possible alternative control logics.

According to a so-called "direct" logic, the locking pin is retracted by powering the electromagnet against the elastic action of a spring, whereas according to a so-called "reverse" logic it is automatically retracted by a spring when the electromagnet power supply is interrupted.

In the prior art relating to the solutions described above, the document DE10056249 describes an ignition switch that, when the key is in the intermediate position, closes a power supply circuit that lights up the instrument panel of the dashboard. Therefore, when this instrument panel is on, the driver knows that the automatic gear selector is not in the parking position.

DE10056249 does not describe in detail the structure of the switch, nor does it detect the intermediate position of the switch and of the key in order to have an acoustic or visual warning signal that is distinct and independent of the general lighting of the instrument panel of the dashboard. Another known solution is described for example in the document U.S. Pat. No. 3,590,612.

There is a need to define in detail how the function of detecting the intermediate position of the key has to be performed, integrating this function in compact ignition switches having a relatively low number of components but providing a high level of safety and operational reliability with regard to the detection of the various key positions. The object of the present invention is meeting the aforesaid requirement in a simple and inexpensive way.

SUMMARY OF THE INVENTION

According to the present invention, it is provided a motor vehicle ignition switch, as defined in claim 1.

The present invention also relates to a motor vehicle ignition device.

According to the present invention, it is provided a motor vehicle ignition device, as defined in claim 11.

BRIEF DESCRIPTION OF THE DRAWINGS

For a better understanding of the present invention, a preferred embodiment is described below by way of non-limiting example and with reference to the attached drawings, in which.

DETAILED DESCRIPTION OF THE INVENTION

Figure 1:
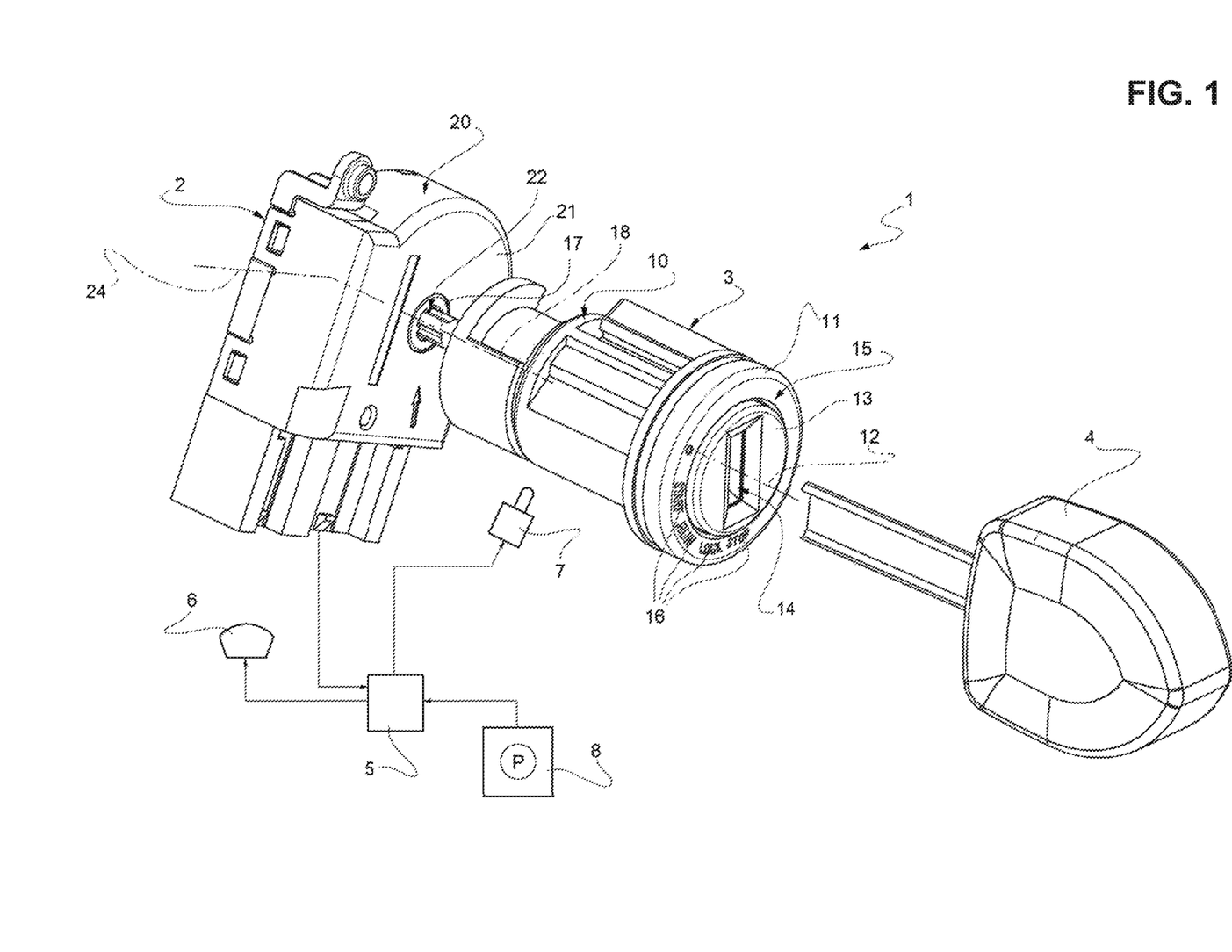
FIG. 1 is a perspective view of an ignition device of a motor vehicle provided with a preferred embodiment of the ignition switch according to the present invention.
Figure 2:
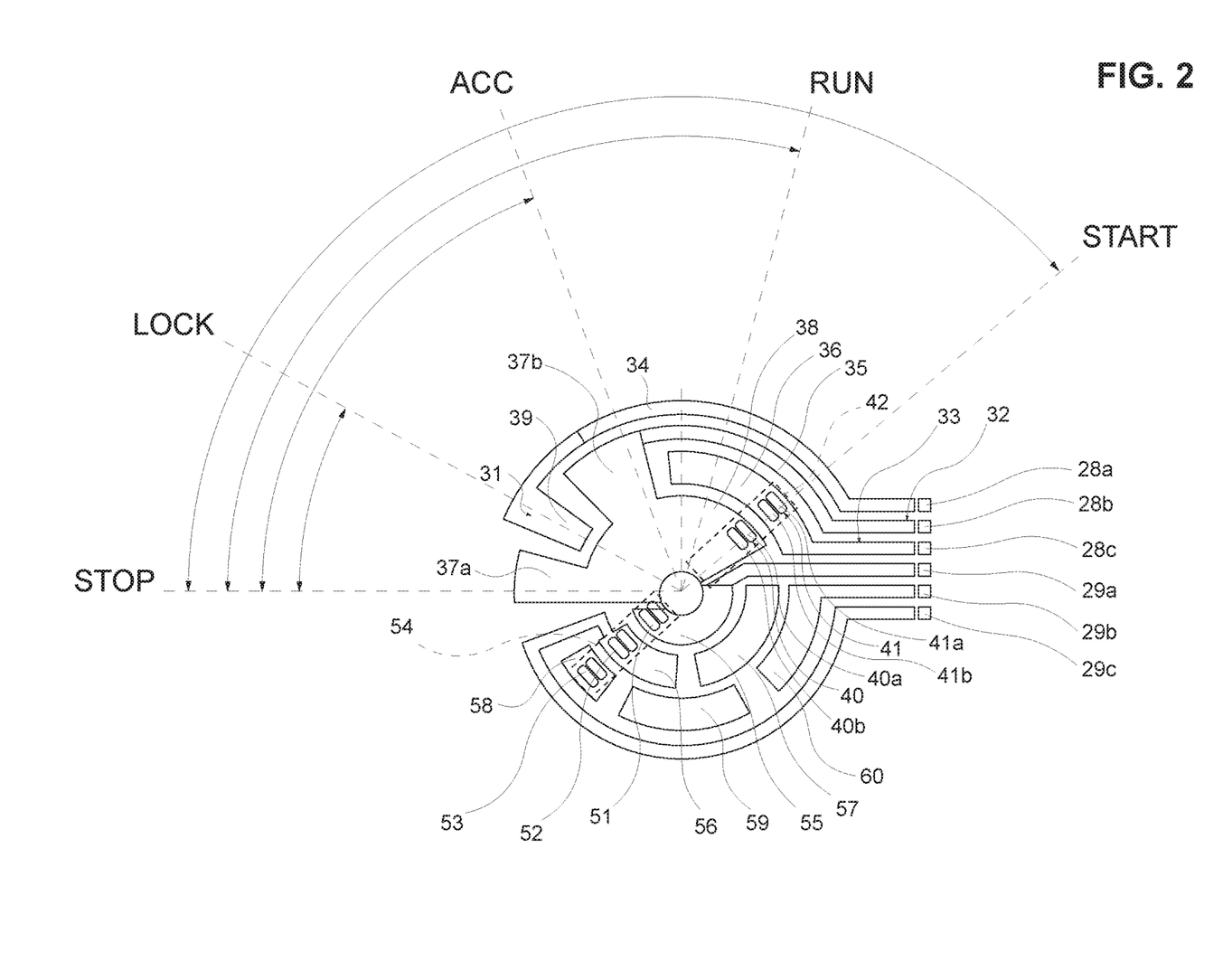
FIG. 2 is a schematic rear view showing two electric circuits of the ignition switch of FIG. 1.
Figure 3:
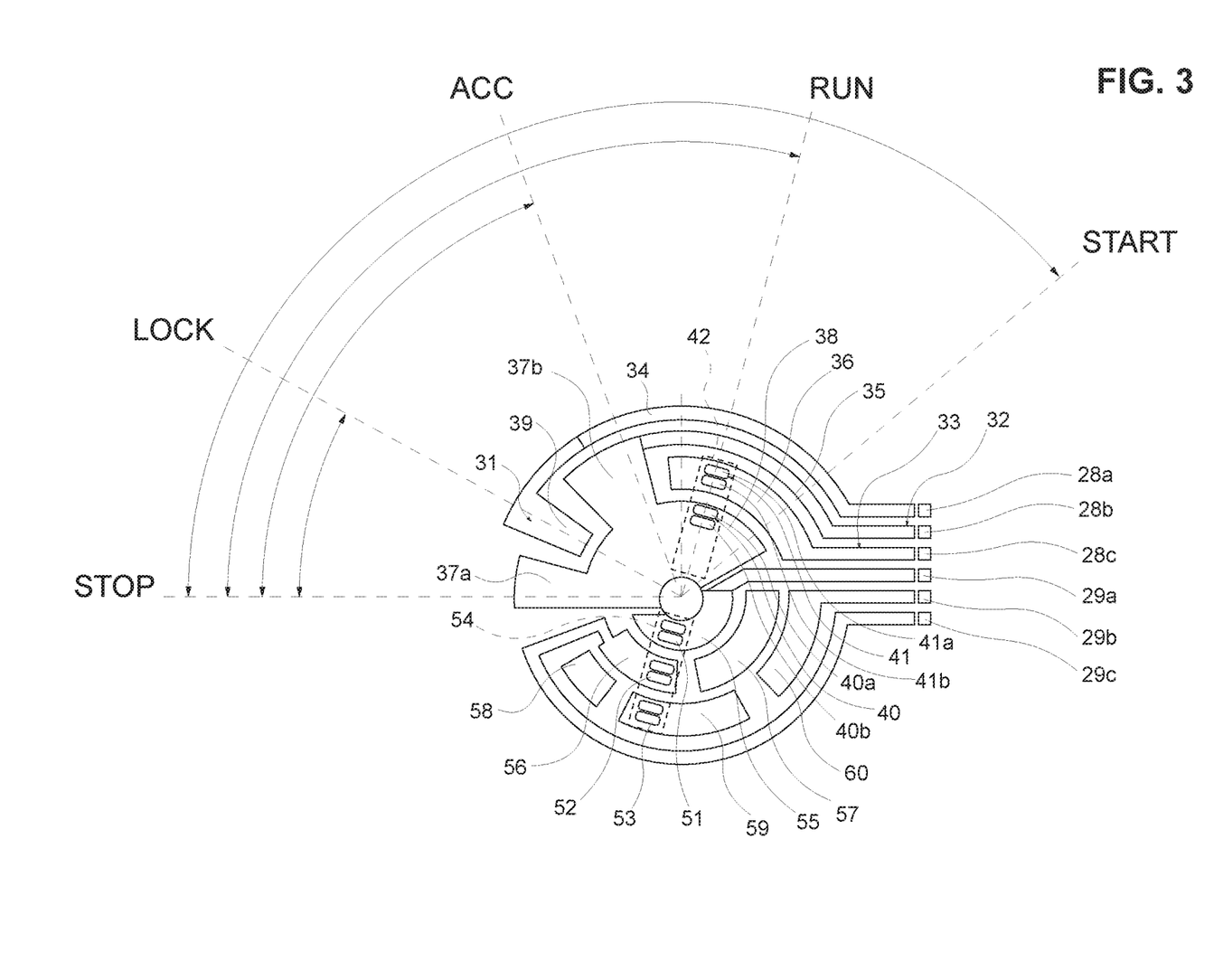
FIGS. 3 to 6 are similar to FIG. 2 and show the electrical circuits of the ignition switch in other operating configurations.

In FIG. 1, the reference number 1 indicates an ignition device for a motor vehicle, of which only some parts are schematically shown. In particular, the motor vehicle is provided with an automatic gear having a selector 8 operable by a driver of the motor vehicle.

The device 1 comprises an ignition switch 2 and an ignition lock 3, acting on the ignition switch 2 and operable through the insertion and subsequent rotation of a key 4.

The device 1 further comprises an electronic processing and control unit 5 (schematically shown) that is electrically connected to the ignition switch 2 as well as to an optical and/or luminous emitter 6 (schematically shown). Moreover, the control unit 5 receives signals indicating the position of the gear selector 8.

During the use of the device 1, based on the actuation of two electric circuits provided in the ignition switch 2, described in detail below, the control unit 5 determines the position of the key 4 and supplies one or more consent signals, which allow activating respective functions and/or operating respective devices in the motor vehicle. Based on the position of the gear selector 8, moreover, the control unit 5 is configured to control the translation of a locking pin 7, which is part of the ignition lock 3. The locking pin 7 is movable between a retracted configuration and an advanced configuration, in which the locking pin 7 acts on a rotating element of the lock 3 so as to prevent the extraction of the key 4 from the lock 3 if the driver has not moved the gear selector 8 into a parking position (for instance while he/she leaves the vehicle).

More generally, as mentioned above, the control unit 5 is configured (in a manner known and not described in detail) to manage the entire operation of the motor vehicle, for example turning on/off an electric system of the motor vehicle, starting an internal combustion engine, etc.

Further referring to FIG. 1, the ignition lock 3 comprises an outer structure 10, which is stationary, extends along an axis 12 and comprises a ring-shaped end portion 11. The ignition lock 3 further comprises a key cylinder 13, rotatably engaging a seat of the structure 3 about the axis 12 and provided with an opening 14 that is provided at the portion 11 to receive the key 4.

Preferably, the portion 11 has a face 15, transverse to the axis 12 and provided with a plurality of illustrations or markings 16, which visually indicate the angular positions in which the key 4 can be manually rotated when inserted in the key cylinder 13.

In particular, the key 4 can be rotated between the following angular positions, ordered according to an hourly sequence with reference to the shown example:

- an off position (STOP), in which the motor vehicle electrical system is not powered and the key 4 can be inserted and removed with respect to the key cylinder 13;
- an intermediate position (LOCK), corresponding to a position in which the locking pin 7, if arranged in the advanced configuration, stops the key cylinder 13 when this latter is rotated towards the off position (STOP);
- an on position or accessory position (ACC), allowing the activation of the electric power supply for some accessory devices forming part of the motor vehicle electrical system (e.g. the radio, an electric steering lock device, etc.);
- a running position (RUN), allowing the electrical power supply of the internal combustion engine (and thus keeping the engine running after starting);
- a starting position (START), allowing the operation of a starter (not shown) designed to start the internal combustion engine.

Generally, the on position ACC is angularly arranged between the off position STOP and the running position RUN, just like the intermediate position LOCK, despite being a distinct and additional position.

Further referring to FIG. 1, the lock 3 further comprises an output shaft 17, which has an axis 18, rotates about the axis 18 in response to the rotation of the key cylinder 13 and is coupled to the ignition switch 2. Preferably, the axis 18 is parallel to the axis 12.

The ignition switch 2 comprises a casing 20 having a front wall 21 that extends orthogonally to the axis 18 and has a hole 22, aligned with the axis 18 and crossed by the shaft 17, which therefore directly actuates the ignition switch 2. According to variants not shown, the ignition switch 2 is operated by the shaft 17 through the interposition of a transmission, e.g. a transmission provided with a gear wheel. The casing 20 (directly or indirectly) supports two electrical circuits, indicated respectively by the reference numbers 26 and 27 in FIGS. 2 to 7. As schematically shown in FIGS. 2 to 6, the circuits 26 and 27 are independent of each other and are respectively provided with three terminals or electrical connectors 28a, 28b, 28c and respectively 29a, 29b, 29c. These terminals are carried by the casing 20 and cantilverly project outwards so that they can be connected by one or more connection lines, namely through wiring, to the control unit 5.

The circuit 26 is generally indicated as a "power circuit" and is the one that allows the control unit 5 to control the power supply to the engine and the power supply to the starter. The circuit 26 comprises three conductive laminas or tracks 31, 32 and 33, distinct and electrically isolated from each other and respectively electrically connected to the terminals 28a, 28b and 28c. Preferably, the laminas 31, 32 and 33 comprise respective circular arc-shaped portions 34, 35, 36, which are concentric with respect to the axis 18. In particular, the portion 34 is arranged in a radially outermost position, the portion 36 in a radially innermost position and the portion 35 in a radially intermediate position.

The lamina 32 further comprises a plate 38 radially arranged inside the portion 36 and two portions 37a and 37b, which radially protrude from the plate 38 outwards so as to be arranged at the same radius as the portion 36 and that are angularly spaced apart. The portion 37a defines a radial appendage that protrudes from one end of the plate 38, while the portion 37b defines a radial spoke that joins an intermediate area of the plate 38 to an end of the portion 35. This latter connects the portion 37b to the terminal 28b. The portion 35 may, however, have a different position and/or shape from that indicated by way of example, since it has only an electrical connection function.

The lamina 31 comprises an appendage 39, which protrudes radially inwards from one end of the portion 34 so as to be interposed, in a circumferential direction, between the portions 37a and 37b. The portion 34 performs solely the function of electrically connecting the appendage 39 to the terminal 28a, so that it could have a shape and/or position different from those shown.

The portions 36, 37a and 37b, the appendage 39 and the plate 38 lie on a same plane, which is orthogonal to the axis 18. The circuit 26 comprises two sliding contacts 40 and 41, which slide along this plane in contact with the laminas 31, 32, 33 and are carried in fixed positions by a support element 42 (shown schematically in dotted line). The support element 42 forms part of a rotor, which is rotated by the shaft 17 about the axis 18 in response to the rotation of the key 4 in the key cylinder 13. It is therefore clear that the rotation of the key 4 causes a simultaneous rotation of the two sliding contacts 40 and 41 about the axis 18.

Figure 4:
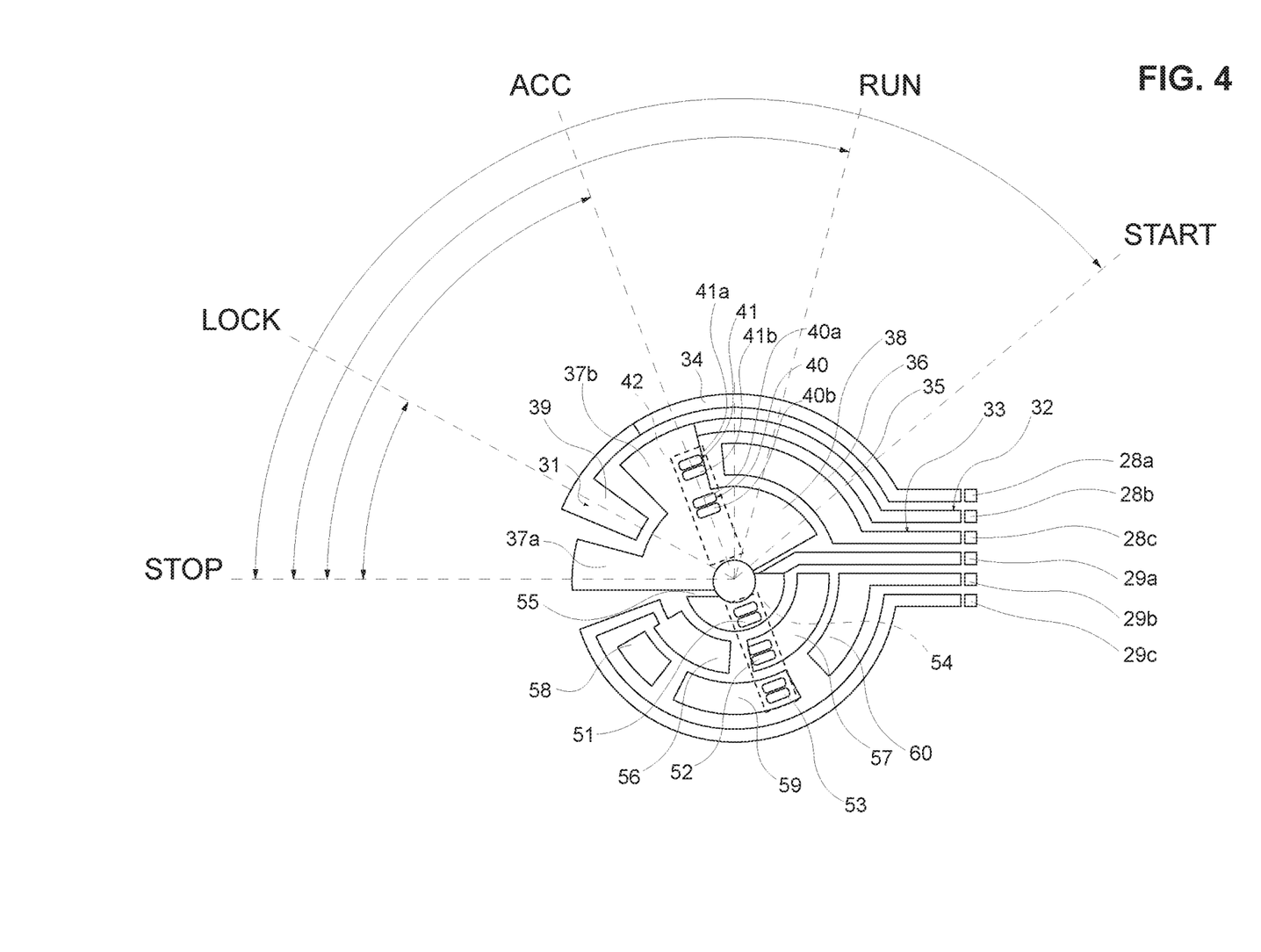
Figure 5:
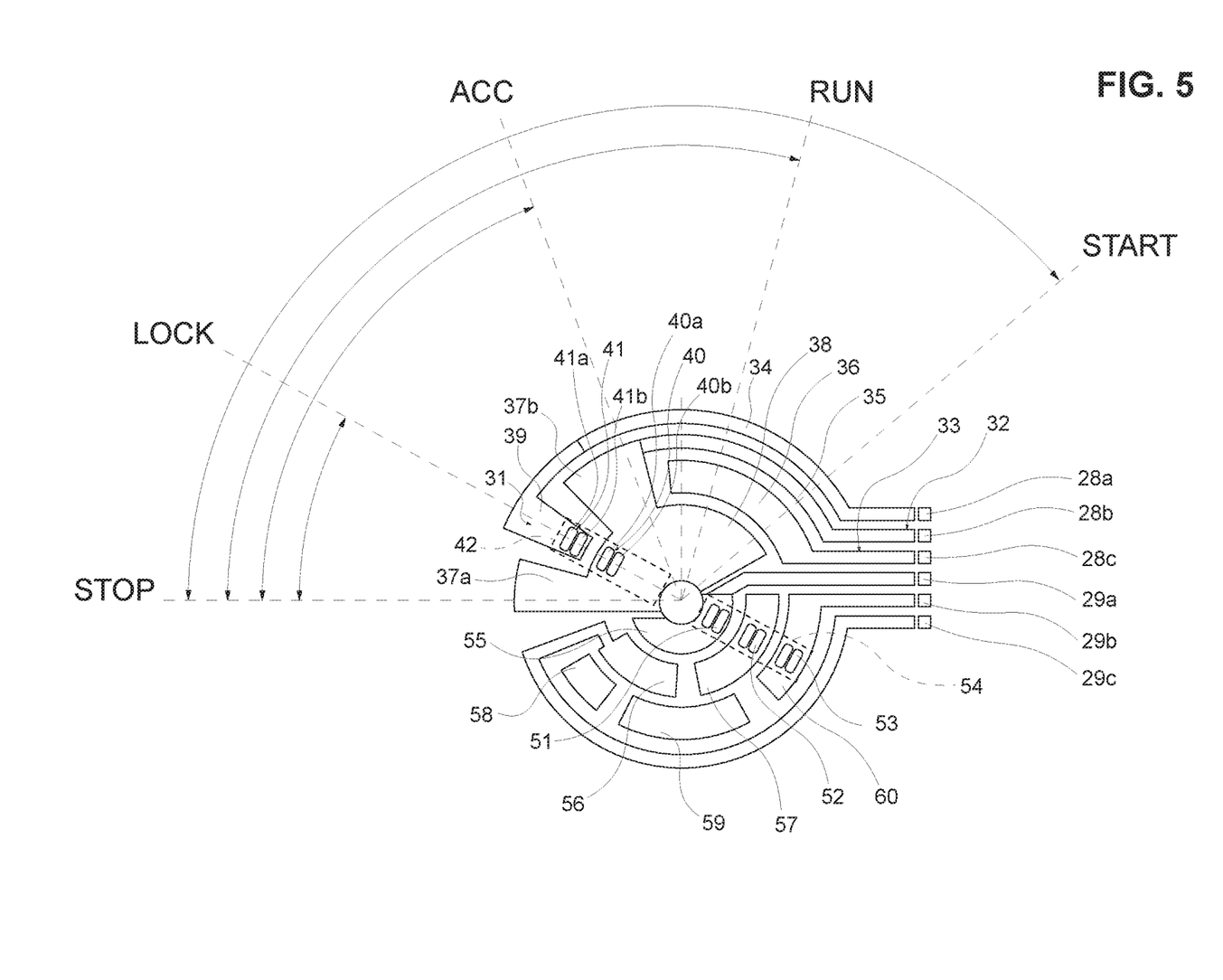
Figure 6:
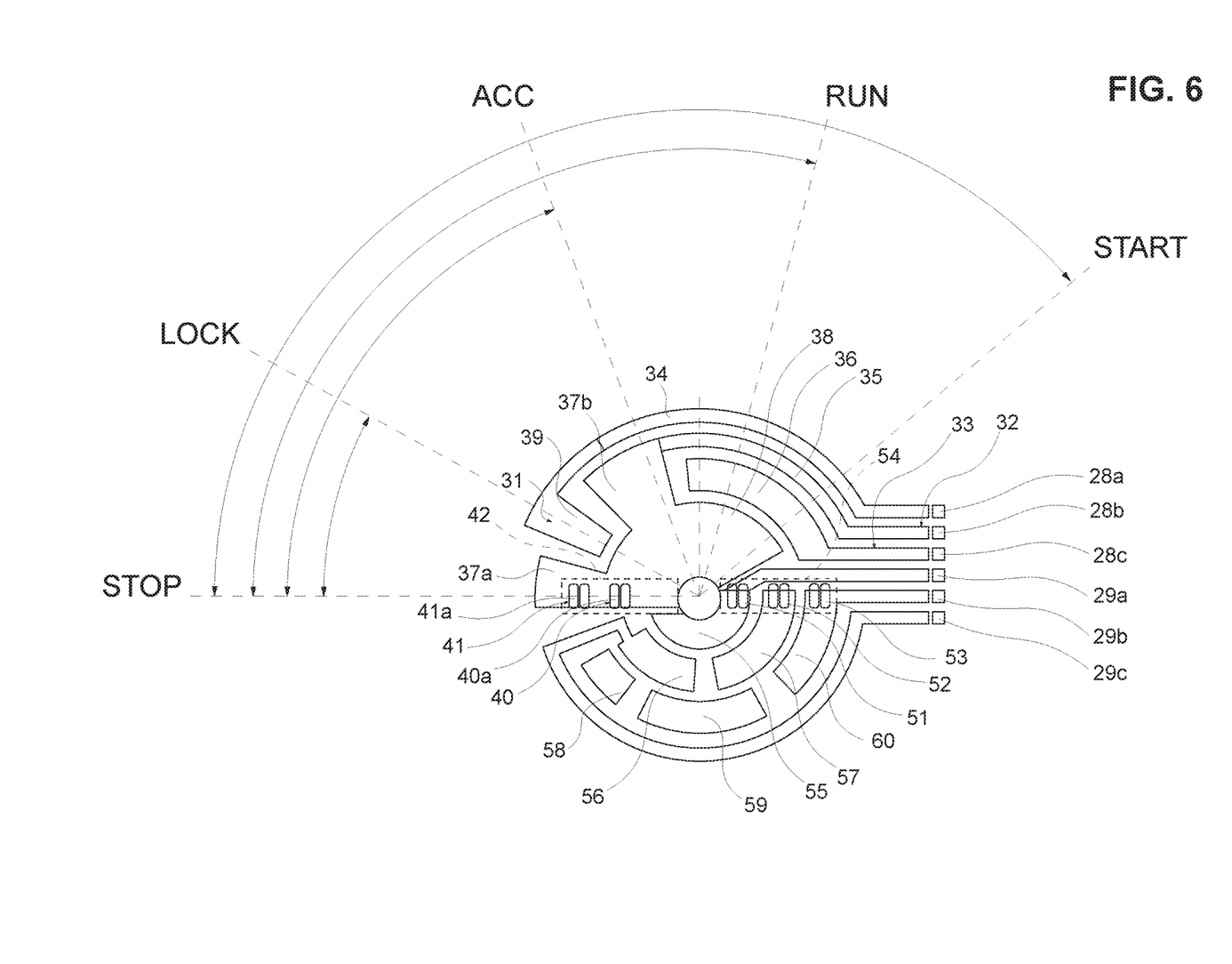

The contacts 40 and 41 are electrically connected to each other, in a manner not shown, on the support element 42. In particular, the sliding contacts 40 and 41 are mutually aligned in a radial direction and are each formed by two elements (40a and 40b and 41a and 41b, respectively), which are spaced apart, in particular in a radial direction. According to a preferred aspect of the present invention, the sliding contact 40 is arranged at the same radius or distance from the axis 18 of the plate 38 and is always resting on the plate 38, independently of the angular position of the key 4. At the same time, the sliding contact 41 is at the same radius or distance from the axis 18 of the portion 36 and during the rotation of the key 4 it selectively rests on the portion 36 or on the portion 37b or on the appendage 39 or on the portion 37a, depending on the angular position of the key 4 about the axis 18. In other words:

- when the key 4 is in the starting position START and when it is in the running position RUN, the contact 41 rests on the portion 36, so that the laminas 33 and 32 are electrically connected to each other (FIGS. 2 and 3);
- when the key 4 is in the intermediate position LOCK, the contact 41 rests on the appendage 39, so that the laminas 31 and 32 are electrically connected to each other (FIG. 5);
- when the key 4 is in the off position STOP and in the on position ACC, the contact 41 rests on the plate 37a and on the plate 37b respectively, whereby the contacts 40 and 41 are short-circuited by the lamina 32 (FIGS. 4 and 6).

Figure 7:
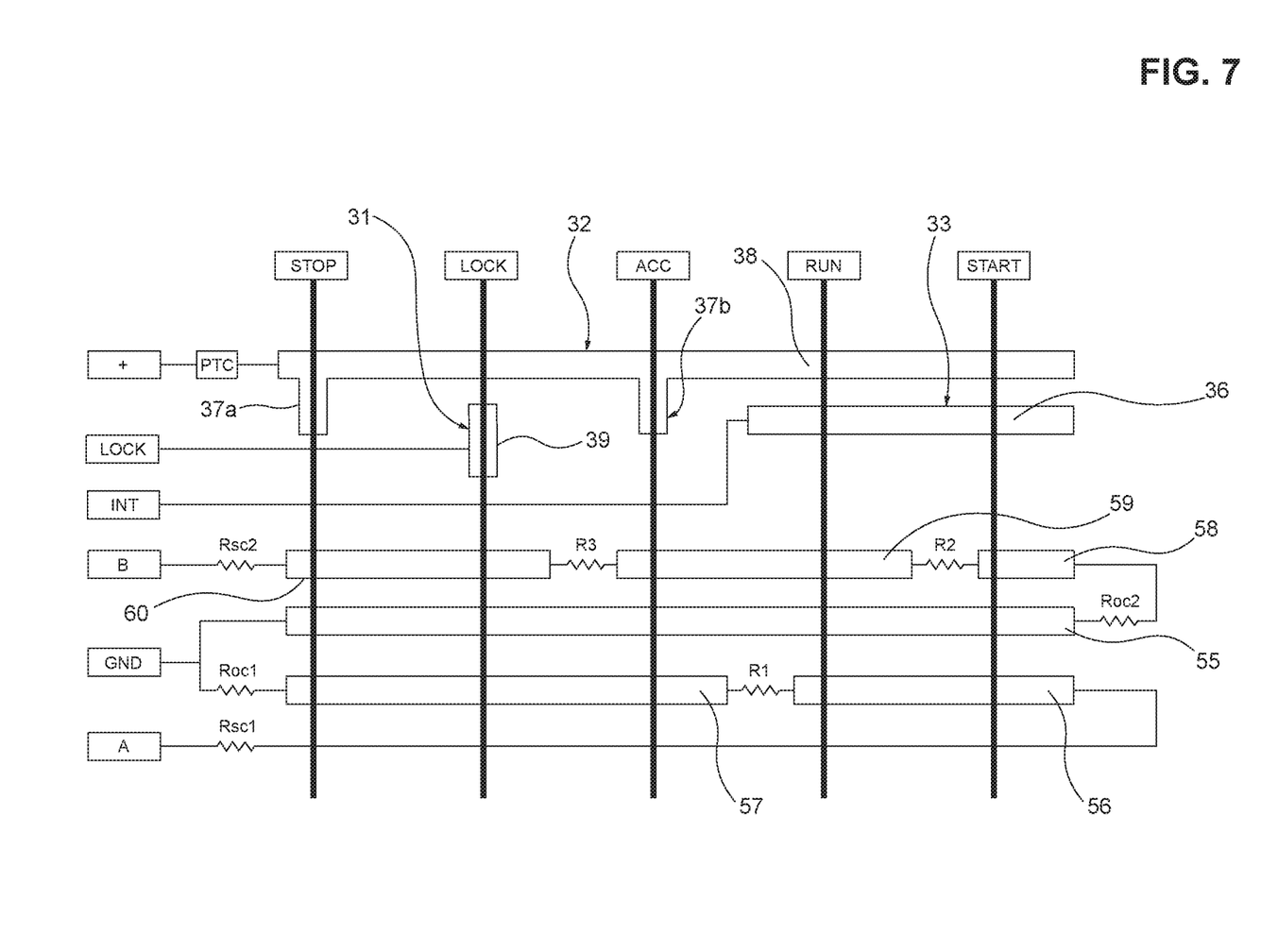
FIG. 7 represents a diagram of the electrical circuits of the ignition switch.

As possible variants, in the position STOP, the contact 41 and/or the contact 40 are in a position electrically isolated from all the laminas 31, 32, 33; and/or in the on position ACC the contact 41 is in a position electrically isolated from all the laminas 31, 32, 33, without the plate 37b. As schematically shown in FIG. 7, the control unit 5 comprises six terminals, respectively indicated by the following codes: +, LOCK, INT, B, GND and A. The terminals +, LOCK, INT are respectively connected to the terminals 28b, 28a and 28c. In particular, the lamina 32 is electrically powered by the terminal+through a protection element or fuse PTC, which forms part of the ignition switch 2.

The terminals B, GND and A are respectively connected to the terminals 29b, 29a and 29c of the circuit 27. This latter is electrically isolated and independent of the circuit 26 and is used by the control unit 5 to identify the position of the key 4, in particular to distinguish the running position RUN from the starting position START (a distinction that cannot be obtained solely through the circuit 26) and to have, at least in some operating conditions, an additional key position signal that is redundant with respect to the one detectable by the control unit 5 at the ends of the terminals 28a, 28b and 28c of the circuit 26. Moreover, the circuit 27 can be used to determine the sequence and the direction of rotation of the key 4, for example to perform appropriate diagnostic functions.

The circuit 27 is defined by a resistive divider or voltage divider, which allows the control unit 5 to detect, at the terminals B, GND and A, voltage or current signals that are (discreetly) variable by varying the position of the key 4. As shown in FIGS. 2 to 6, the circuit 27 comprises three sliding contacts 51, 52 and 53, which are carried by a support element 54 (schematically shown in dotted line) and are electrically connected on the support element 54. Preferably, each contact 51, 52, 53 is formed by a relative pair of elements, radially spaced apart (as for the contacts 40 and 41). The support element 54 constitutes part of the rotor, which is rotated by the shaft 17 about the axis 18.

In other words, the support elements 42 and 54 are angularly fixed with respect to each other so as to rotate together about the axis 18 in response to the rotation of the key 4. The circuit 27 comprises six conductive laminas or tracks 55, 56, 57, 58, 59 and 60, which are shaped like an arc of circumference, are spaced apart by means of a material that is not electrically conductive and are concentric with respect to the axis 18. Preferably, the tracks 55, 56, 57, 58, 59 and 60 lie on the same plane where the portion 36 and the plate 38 are arranged, but are positioned in a diametrically opposite area.

The track 55 is arranged at an innermost radius, coinciding with the radial position of the contact 51, and is electrically connected to the terminal 29a, which in turn is connected to the terminal GND of the control unit 5 to define a grounding of the electrical circuit (FIG. 7). The tracks 56 and 57 are at an intermediate radius, coinciding with the radial position of the contact 52 and the tracks 58, 59, and 60 are at an outermost radius, coinciding with the radial position of the contact 53. The tracks 56 and 60 are electrically connected to the terminals 29c and, respectively, 29b.

In particular, as shown in FIG. 7, the track 56 is electrically connected to the terminal A of the control unit through a resistor Rsc1, and the track 60 is connected to the terminal B of the control unit through a resistor Rsc2. More in particular, the track 57 is connected to the track 55 and to the terminal GND through a resistor Rod and to the track 56 through a resistor R1. The track 59 is connected to the tracks 60 and 58 by means of respective resistors R3 and R2, whereas on the other hand the track 58 is connected to the track 55 through a resistor Roc2. As mentioned above, these electrical connections are shown in detail in the electrical diagram of FIG. 7.

For each angular position that the key 4 can take, the contact 51 is permanently in contact on the track 55. When the key 4 is in the starting position START (FIG. 2), the contact 52 is resting on the track 56, while the contact 53 rests on the track 58. When the key 4 is in the running position RUN (FIG. 3), the contact 52 is resting on the track 56, while the contact 53 still rests on the track 59. When the key 4 is in the on position ACC (FIG. 4), the contact 52 is resting on the track 57, while the contact 53 still rests on the track 59. Finally, when the key 4 is in the off position STOP or in the intermediate position LOCK (FIGS. 6 and 5), the contact 52 is still resting on the track 57, while the contact 53 rests on the track 60.

In use, by combining the signals determined by the two circuits 26 and 27, the control unit 5 unambiguously recognizes that the key 4 is actually in the off position STOP and therefore can be extracted.

As mentioned above, the control unit 5 is configured so as to provide an alarm signal when it detects that the key 4 is in the intermediate position LOCK, after a rotation of the key 4 from the running position RUN to the off position STOP thanks to the signals determined by the circuits 26 and/or 27. Preferably, the control unit 5 uses only the signals of the circuit 26 and not those of the circuit 27 to identify the intermediate position LOCK and, therefore, to activate the alarm signal.

This alarm signal commands the emitter 6 to provide an optical and/or acoustic warning to the driver and to signal that the key 4 is in the intermediate position LOCK, i.e. that it has not been completely rotated into the off position STOP. According to an aspect of the present invention, the emitter 6 is an independent component, separate from the instrument panel of the dashboard, and is powered/controlled separately and distinctly from the power supply of the warning lights and indicators that are present in this instrument panel.

It is therefore clear how the activation of the emitter 6 indicates that the gear selector 8 is arranged in positions other than the parking position. In fact, the control unit 5 is configured to maintain the locking pin 7 in an advanced configuration when the gear selector 8 is arranged in positions other than the parking position. As mentioned above, in the advanced configuration, the locking pin 7 prevents the rotation of the key 4 towards the off position STOP, interfering in a known and not shown way on the rotation of the key cylinder 13.

At the same time, the control unit 5 is configured to retract the locking pin 7 when the selector 8 is in the parking position to allow the key 4 to be rotated from the intermediate position LOCK to the off position STOP. After this rotation, the emitter 6 is automatically deactivated. From the foregoing, the advantages of the ignition switch 2 are clear.

Thanks to the electric circuits 26 and 27 provided in the ignition switch 2, the intermediate position LOCK is detected in a dedicated and univocal way. In particular, the circuit 26 allows recognizing that the key 4 is in an intermediate position LOCK in a relatively simple way and with a relatively low number of components, since the sliding contacts (40 and 41) of the circuit 26 are only two.

At the same time, the presence of the two electric circuits 26 and 27, which are independent of each other, allows guaranteeing a high reliability and safety in detecting the angular position of the key 4. Despite the duplication of the circuits, the arrangement of the components in the ignition switch 2 allows obtaining a very compact solution. Finally, it is evident to a person skilled in the art that modifications and variations can be made to the ignition switch 2 described above with reference to the attached figures without thereby departing from the scope of protection of the present invention as defined in the attached claims.

In particular, the shape and position of the conductive tracks or laminas and/or the relative position of the two circuits 26 and 27 could be different from those described by way of example. In particular, the resistive divider defined by the circuit 27 could have different characteristics with respect to the specific example described above with reference to the attached figures; and/or the tracks of the circuit 27 could not be coplanar with the portion 36 and the plate 38 of the circuit 26; and/or the contacts 40 and 41 and the contacts 51, 52, 53 could be carried by two separate rotors, both rotatable in response to the rotation of the key 4.

Moreover, as mentioned above, the rotor with the contacts 40, 41, 51, 52 and 53 could be coupled to the key cylinder 13 by means of a transmission different from the simple shaft 17; and/or the support elements 42 and 54 could each be provided with three contacts, so as to be equal and standardize the production even if one of the contacts of the support element 42 becomes redundant.

The invention claimed is:

1. A motor vehicle ignition switch comprising a first and a second electric circuit for detecting the angular position of a key in an ignition lock, said first and second circuit comprising respective electrical contacts carried by at least one rotor, which is rotatable about a rotation axis so as to be able to selectively take:
    an off position, wherein said key can be inserted into, or withdrawn from, said ignition lock;
    a starting position;
    a running position, angularly arranged between said off position and said starting position;
    an intermediate position, angularly arranged between said running position and said off position;
    an on position, angularly arranged between said running position and said off position and distinct from said intermediate position;
said second circuit being independent of said first circuit and defining a resistive divider;
said first circuit comprising a first, a second and a third conductive laminas, electrically isolated from each other; the electrical contacts of said first circuit comprising a first and a second contact, electrically connected to each other; said second contact being in contact on said third conductive lamina in the running position and in the starting position and being in contact on said first conductive lamina in the intermediate position.

2. The switch according to claim 1, wherein said first contact is in contact on a plate forming part of said second conductive lamina in the running position, in the starting position, in the on position and in the intermediate position.

3. The switch according to claim 2, wherein said second contact is arranged in contact on said second conductive lamina in the on position.

4. The switch according to claim 2, wherein said first and second contact are in contact on said second conductive lamina in the off position.

5. The switch according to claim 1, wherein said third conductive lamina comprises an arc-shaped portion arranged at a same radius and on a same plane with respect to a contact portion forming part of said first conductive lamina.

6. The switch according to claim 5, wherein said first conductive lamina comprises a connecting portion, said contact portion defining an appendage that radially protrudes towards said rotation axis from said connecting portion.

7. The switch according to claim 1, wherein said first, second and third conductive laminas are coplanar.

8. The switch according to claim 1, wherein said second circuit comprises a plurality of conductive tracks electrically connected to each other and spaced apart by means of a non-conductive material; the electrical contacts of said second circuit comprising a third, a fourth and a fifth contact.

9. The switch according to claim 8, wherein said conductive tracks are arranged in a diametrically opposite area with respect to said first, second and third conductive laminas.

10. The switch according to claim 8, wherein said conductive tracks have the shape of a circular arc and are arranged along three different radii with respect to said rotation axis.

11. An ignition device comprising:
    an ignition switch according to claim 1;
    an ignition lock designed to receive a key and comprising a locking pin, which is movable between a retracted configuration, in which the key is free to rotate, and an advanced configuration, in which the locking pin prevents the key from rotating from the intermediate position to the off position;
    a processing and control unit connected to said ignition switch so as to detect the position of said rotor through said first and second circuit; said processing and control unit being configured so as to position, in use, said locking pin in the advanced configuration if a selector of the motor vehicle is not in a parking position, and in the retracted configuration if said selector is in the parking position; said processing and control unit being furthermore configured to emit an alarm signal when it detects, through said first and second circuit, that said rotor stops in the intermediate position during a rotation from the running position to the off position.

* * * * *